(12) United States Patent
Benjey et al.

(10) Patent No.: US 7,644,740 B2
(45) Date of Patent: Jan. 12, 2010

(54) FUEL DISCRIMINATING FILLER NECK COVER

(75) Inventors: Robert P. Benjey, Dexter, MI (US); Paul D. Walkowski, Ann Arbor, MI (US); Russell C. Jahnke, Ann Arbor, MI (US); Andrew W. McIntosh, Ann Arbor, MI (US); David Adam Deboskey, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 229 days.

(21) Appl. No.: 11/712,749

(22) Filed: Mar. 1, 2007

(65) Prior Publication Data
US 2008/0210333 A1 Sep. 4, 2008

(51) Int. Cl.
*B65B 1/04* (2006.01)
*B65B 3/00* (2006.01)
(52) U.S. Cl. ............... 141/350; 141/348; 141/349; 220/86.2; 220/203.1; 220/246
(58) Field of Classification Search ........... 141/301, 141/348–350; 220/86.2, 203.1, 245, 246, 220/816, 821–824; 251/48–55, 64
See application file for complete search history.

(56) References Cited

U.S. PATENT DOCUMENTS

| 2,145,758 | A | * | 1/1939 | Fellows et al. | 220/822 |
| 5,435,358 | A | * | 7/1995 | Kempka et al. | 141/312 |
| 5,732,842 | A | | 3/1998 | Krause | |
| 6,539,990 | B1 | * | 4/2003 | Levey et al. | 141/301 |
| 7,147,019 | B2 | | 12/2006 | Walkowski | |
| 7,461,673 | B2 | * | 12/2008 | Busch et al. | 141/350 |

OTHER PUBLICATIONS

European Automotive Design (EAD), Nov. 12, 2006, p. 12.

* cited by examiner

*Primary Examiner*—Timothy L Maust
(74) *Attorney, Agent, or Firm*—Anna M. Shih

(57) ABSTRACT

A protective cover for a filler neck is designed to discriminate between different sizes of fuel nozzles. The cover includes a body portion and a movable door that covers and exposes an opening in the filler neck. The body portion has a pair of spaced body protrusions that form a gate, and the door has a ledge that may also be formed by a pair of spaced door protrusions. The protrusions on the door can be easily moved to an open position by pressing a tip of a fuel nozzle against the protrusions. The gate and the ledge are configured so that they can accommodate the fuel nozzle for only one type of fuel.

15 Claims, 4 Drawing Sheets

FUEL DISCRIMINATING FILLER NECK COVER

TECHNICAL FIELD

The present invention relates to filler neck closures, and more particularly to a protective cover that can discriminate between different types of fuels.

BACKGROUND OF THE INVENTION

Vehicle emissions standards have become increasingly stringent due to knowledge of the negative environmental effects of hydrocarbon emissions, which are generated by fuel vapors released into the atmosphere. For vehicles and other fuel-operated devices, controlling and containing fuel vapors is important to reduce emissions. Vehicles contain an on-board diagnostic system that monitors whether the fuel system is completely vapor-tight.

The refueling process requires a user to remove a closure, such as a gas cap, which seals a filler neck in the fuel system when the gas cap is screwed over or onto the filler neck. Screwing and unscrewing the gas cap requires the user to undergo several different steps and motions during the refueling process that must either be conducted with two hands or as separate steps (i.e., it is difficult to unscrew a gas cap and hold a refueling nozzle using the same hand at the same time). Although gas caps having doors or other openings have been proposed in the past, these structures do not form the seals required to meet current stringent emissions requirements. Moreover, these structures tend to leave the opening of the filler neck and any associated flapper door exposed to potentially corrosive environmental contaminants, such as mud, rain, dust, etc.

Further, in areas where both diesel fuel and conventional gasoline are both used as fuels, it is possible for a user in a hurry to mistakenly insert a gasoline fuel nozzle into a diesel fuel filler neck because a gasoline fuel nozzle has a smaller diameter than a diesel fuel nozzle.

There is a desire for a structure that can protect an opening in a filler neck from environmental contaminants while allowing the structure to be easily manipulated by the fuel nozzle alone. There is also a desire for a structure that can easily prevent a user from inserting a gasoline fuel nozzle into a diesel fuel filler neck and vice versa.

SUMMARY OF THE INVENTION

The present invention is directed to a protective cover for a filler neck. The cover includes a body portion and a movable door that covers and exposes an opening in the filler neck. The body portion has a pair of spaced body protrusions that form a gate, and the door has a ledge that may also be formed by a pair of spaced door protrusions. The protrusions on the door can be easily moved to an open position by pressing a tip of a fuel nozzle against the protrusions. The gate and the ledge are configured so that they can accommodate the fuel nozzle for only one type of fuel. In one embodiment, for covers to be used on gasoline-powered vehicles, the gate size allows a smaller gasoline nozzle to pass through it to engage the ledge on the door and allow the door to be opened by the nozzle. In this embodiment, the narrowness of the gate blocks a larger diesel nozzle from reaching the door, ensuring that only the gasoline nozzle can open the door. This configuration can be modified to accommodate urea nozzles and block both gasoline and diesel nozzles.

In another embodiment, the gate is wide enough to allow the larger diesel nozzle to pass through, but the protrusions on the door are too far apart to engage the smaller gasoline nozzle. In this case, only the diesel nozzle can open the door.

The inventive cover may be used in conjunction with a capless filler neck having a flapper that is pulled shut by a latch structure to form a vapor-tight seal.

DETAILED DESCRIPTION OF THE EMBODIMENTS

Although the examples described below focus on cap for distinguishing between diesel fuel and gasoline or between gasoline and urea, the invention can be used in any system where two types of liquids (e.g., fuels) are dispensed using different nozzle sizes to prevent the wrong liquid type from entering the system.

Figure 1:
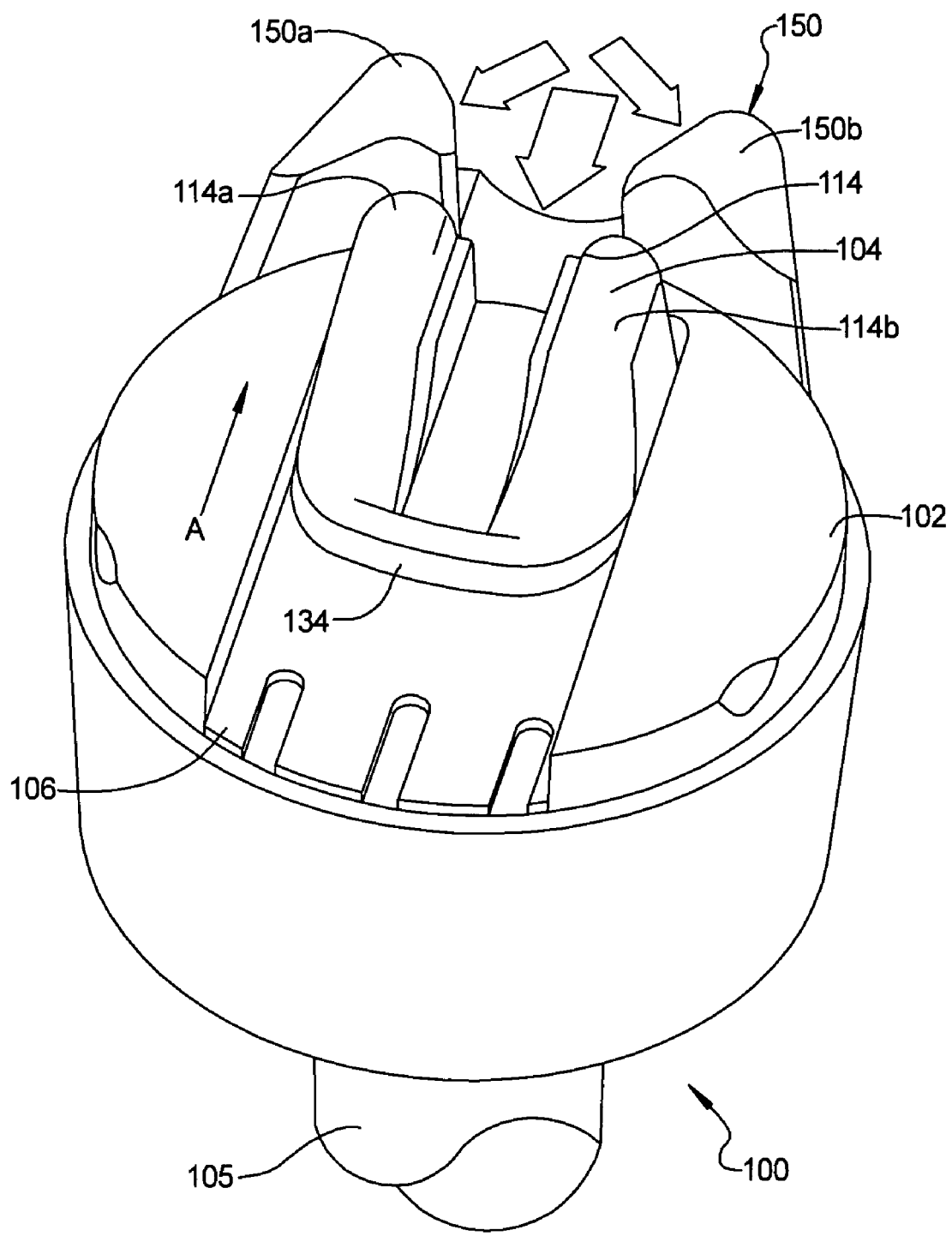
FIG. 1 is a perspective view of a filler neck cover according to one embodiment of the invention.
Figure 2:
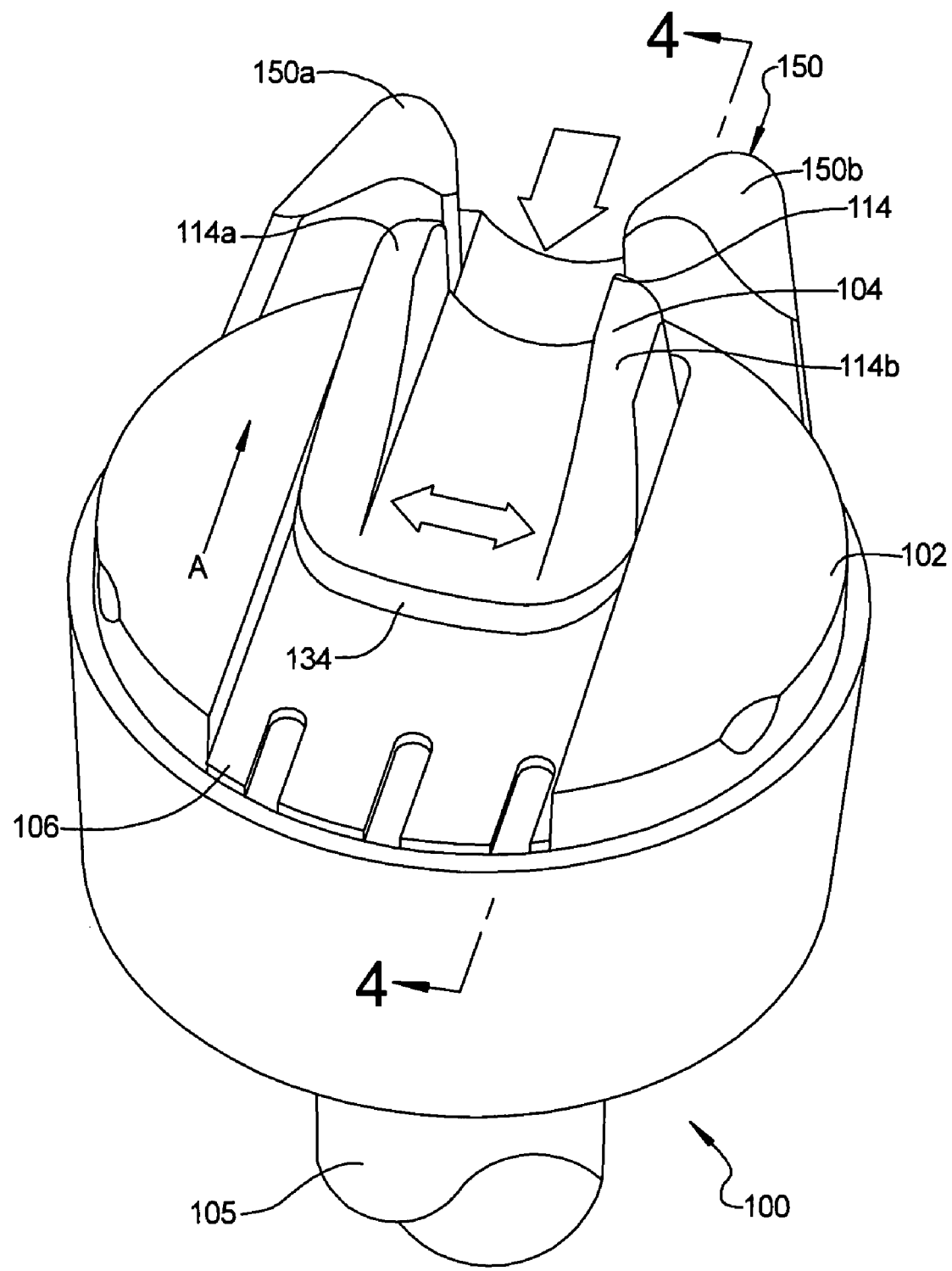
FIG. 2 is a perspective view of a filler neck cover according to another embodiment of the invention.
Figure 3:
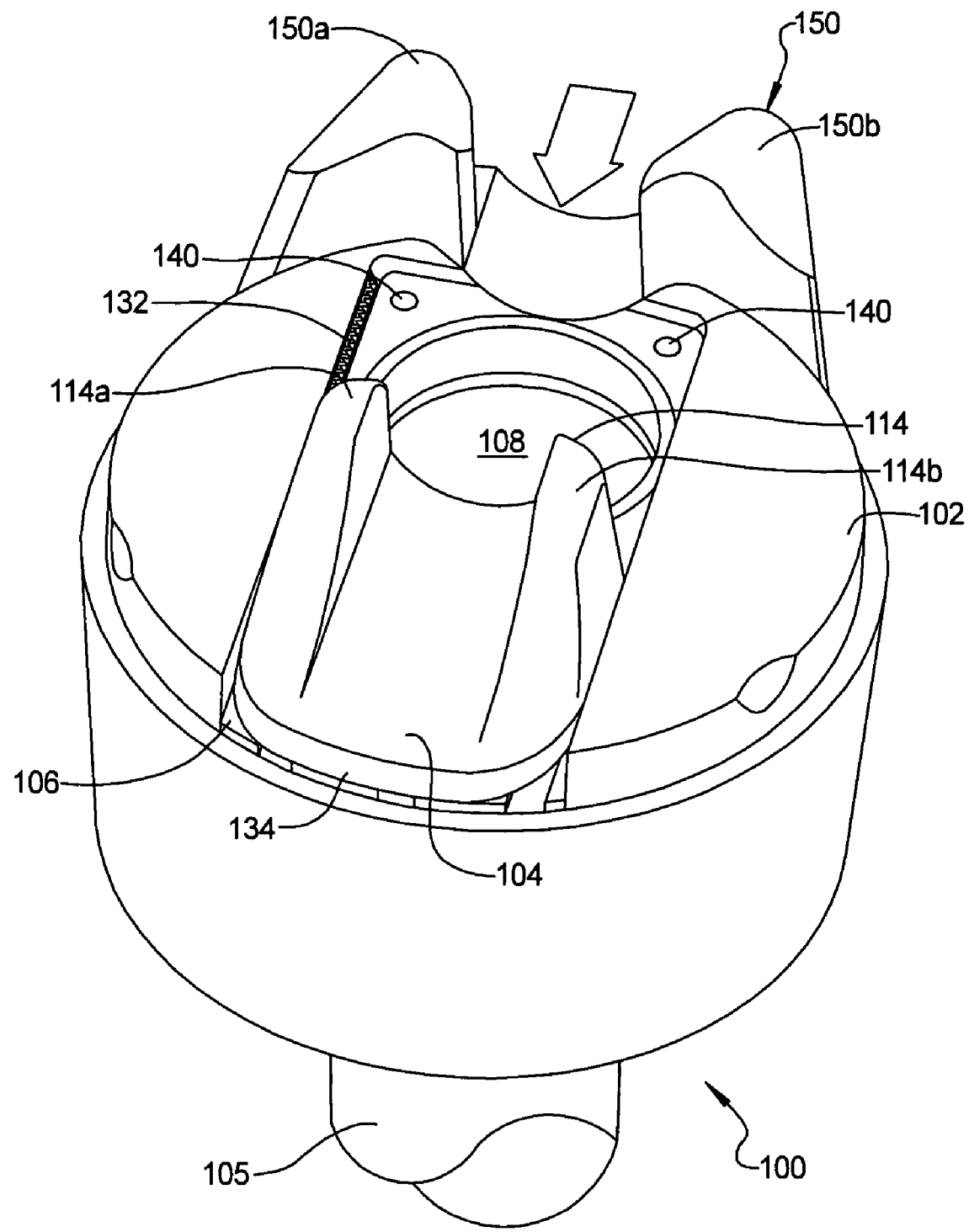
FIG. 3 is a perspective view of the filler neck cover in FIG. 2 in an open position.

Referring to FIGS. 1 and 2, a protective cover 100 for a filler neck 105 in a fuel system comprises a body portion 102 and a movable protective door 104. The cover 100 is preferably made of any material that is durable enough to resist deterioration in harsh environmental conditions over an extended time period, such as plastic. In the illustrated embodiment, the door 104 is slidable along a channel 106 to either expose or cover an opening 108 that can accommodate a fuel nozzle. The opening 108 is aligned with an opening in the filler neck. The channel 106 helps retain the door 104 in the body portion 102 as it slides in the channel 106. The cover 100 may include one or more resilient members 132 that biases the door 104 in the direction of arrow A toward a closed position, if desired. The resilient members 132 may be tucked on either side of the channel 106. The cover 100 may include a scraper 134 on the door 104. The scraper 134 removes dirt that has accumulated on the body portion 102, particularly in the channel 106, as the door 104 slides open.

FIGS. 1 and 2 show different possible embodiments of the invention that can accommodate different fuel nozzle sizes. FIG. 1 shows an embodiment that accommodates a gasoline fuel nozzle, while FIG. 2 shows an embodiment that accommodates a diesel fuel nozzle. In both embodiments, the body portion 102 has a gate 150 formed of protrusions 150*a*, 150*b* that are spaced apart at a selected distance. The door 104 has a ledge 114 that acts as a support for the tip of the fuel nozzle when the fuel nozzle is used to push the door 104 open. The ledge 114 can have any configuration that allows the door 104 to be easily opened simply by applying pressure to the ledge 114.

To open the door 104, a user applies pressure on the ledge 114 using the tip of the fuel nozzle to slide the door 104 to an open position and expose the opening 108, providing access to the filler neck. As long as the fuel nozzle is inside the opening 108, the door 104 will remain held open. If the door 104 is resiliently biased toward the closed position, removing the fuel nozzle from the opening 108 will cause the door 104 to close automatically and cover the opening 108.

In one embodiment, the ledge 114 may be in the form of a pair of door protrusions 114a, 114b such as fins, pegs, or other formations. The door protrusions 114a, 114b may be configured to divert water away from the opening 108, if desired. The spacing of the protrusions 114a, 114b depends on the application in which the cover 100 will be used; generally, the door protrusions 114a, 114b are spaced so that they will accommodate the appropriate fuel nozzle for its specific application.

The embodiment in FIG. 1 shows a cover 100 that accommodates a gasoline fuel nozzle. In this embodiment, the gate protrusions 150a, 150b are spaced so that only a gasoline nozzle can pass between them to reach the door 104. A diesel nozzle, which has a larger diameter than a gasoline nozzle, is too large to pass between the gate protrusions 150a, 150b and therefore cannot reach the door 104. As a result, the diesel nozzle never touches the door 104 and therefore cannot open the door 104 to expose the opening 108.

The gasoline nozzle, by contrast, has a small enough diameter to pass between the gate protrusions 150a, 150b and touch the door protrusions 114a, 114b. The door protrusions 114a, 114b are spaced at a distance equal to or less than the gasoline nozzle diameter so that the gasoline nozzle cannot pass between them. The gasoline nozzle therefore engages the ledge 114 to slide the door 104 open. Once the door 104 is open, the gasoline nozzle can enter the opening 108 for refueling.

Note that this embodiment can be modified to discriminate between gasoline fuel and urea fuels as well. A urea nozzle has a smaller diameter than a gasoline nozzle (and, as a result, smaller than a diesel nozzle as well). For a urea fuel application, the gate protrusions 150a, 150b can be spaced at a distance smaller than the diameter of the gasoline nozzle and equal to or greater than the diameter of the urea nozzle so that only the urea nozzle can pass through the gate 150. The door protrusions 114a, 114b in turn are spaced at a distance smaller than the diameter of the urea nozzle so that the nozzle can engage the door protrusions 114a, 114b to open the door 104. In short, the embodiment shown in FIG. 1 can be configured to discriminate between different types of fuels, depending on the desired application.

The embodiment in FIG. 2 is a cover 100 that accommodates a diesel fuel nozzle, which has a larger diameter than a gasoline nozzle and a urea nozzle. In this example, the plurality of fins include two door protrusions 114a, 114b that are spaced apart from each other. The distance D between the door protrusions 114a, 114b is large enough to allow a gasoline fuel nozzle to slip between them without engaging the ledge 114 formed by the door protrusions 114a, 114b while still being close enough together for a larger diesel fuel nozzle to engage the ledge 114. As a result, the spacing of the door protrusions 114a, 114b allow the door 104 to be opened only by the tip of a diesel fuel nozzle and not by the smaller gasoline fuel nozzle or urea nozzle. The slippage of the smaller fuel nozzle between the door protrusions 114a, 114b also alerts the user that the wrong fuel nozzle is being used. As a result, only the diesel fuel nozzle 120, and not the gasoline or urea fuel nozzle 122, is able to slide the door 104 open in this embodiment.

Figure 4:
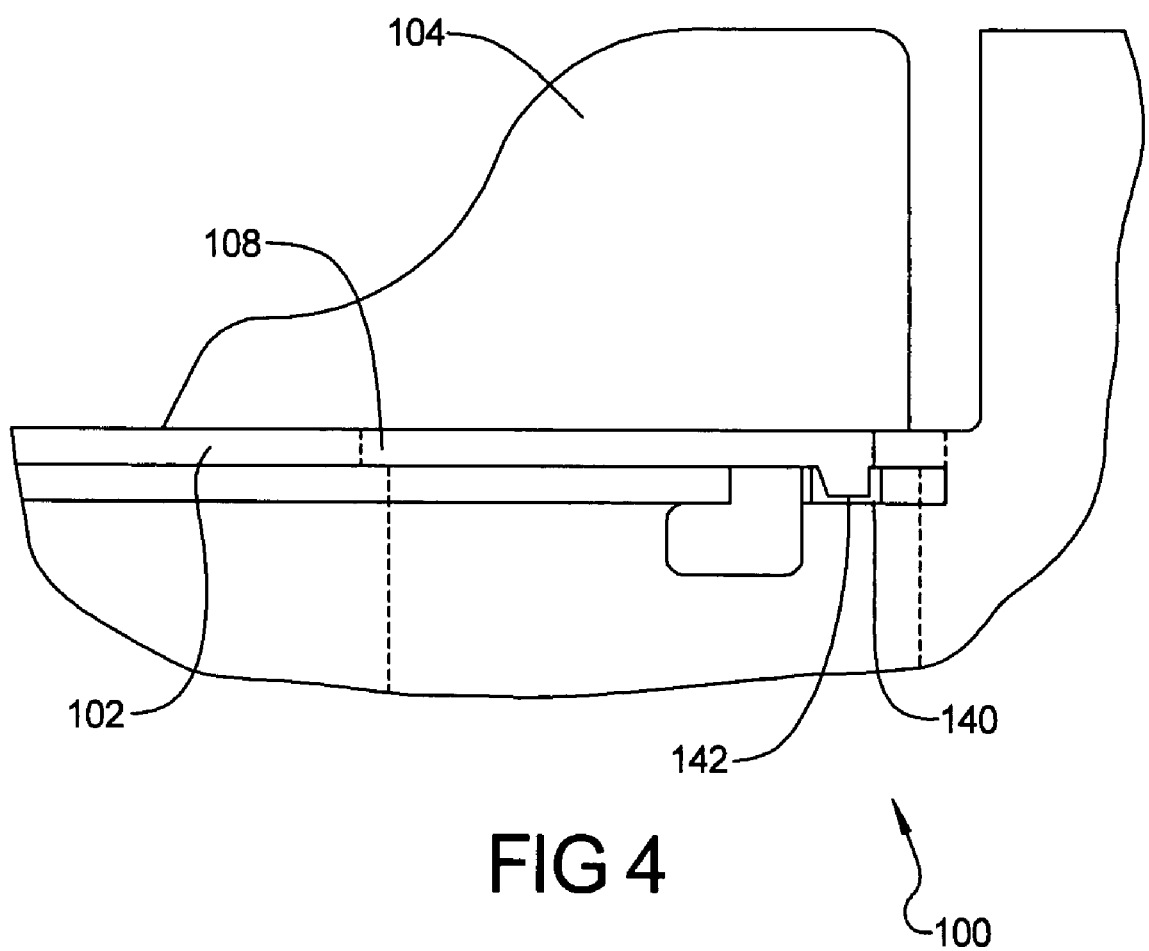
FIG. 4 is section view of the filler neck cover in FIG. 2 taken along line 4-4.

As shown in FIG. 4, the cover 100 may incorporate a door catch structure to prevent the door 104 from being forced open by environmental forces, such as high-pressure car wash sprays. In one embodiment, the door catch structure includes a recess 140 formed in the body portion 102 and a corresponding catch 142 that engages with the recess 140 when pressure is applied to the door 104 in a direction substantially normal to the sliding direction of the door. Of course, the recess 120 can be on the door and the catch 142 can be on the body portion 102 without departing from the scope of the invention.

When environmental forces press on the door 104, the engagement between the recess 140 and the catch 142 prevents the door 104 from sliding open inadvertently. The recess 140 and catch 142 are preferably shallow and small enough so that very little force is needed to prevent the door 104 from being forced open by a force normal to the plane of the cover 100 without obstructing door 104 movement when a nozzle applies a downward force to the door 104. Moreover, the point at which the nozzle applies force to the door 104 is above the plane of the cover 100, creating a torque load on the door 104 that moves the catch 142 out of the recess 140. A self-wiping seal (not shown) may also be included to prevent contaminant buildup.

By incorporating a protective door that is movable to cover and reveal a filler neck, the inventive filler neck cover protects the filler neck opening and any associated closures (e.g. a flapper door) from being contaminated or damaged by environmental factors. The spacing of the protrusions also discriminates between a diesel fuel nozzle and a gasoline fuel nozzle, allowing only one of them to open the door, preventing a user from mistakenly filling the fuel tank with the wrong type of fuel for the vehicle. The inventive cover may be part of a capless filler neck system that closes and seals itself automatically, such as the one described in U.S. application Ser. No. 11/047,071, filed Jan. 31, 2005. If the inventive structure is used in an automatically sealing capless filler neck system, the cover may be coupled to, for example, a latch structure that biases the door in the cover toward the closed position so that the door and the latch structure both move toward a closed position when the nozzle is removed from the filler neck.

In example of this arrangement, sliding the nozzle against the ledge 114 formed by the spaced door protrusions 114a, 114b will in turn slide the door 104 to expose a flapper that seals the filler neck opening. This sliding motion also causes the latch structure to unlatch, freeing the flapper in the filler neck to move when the fuel nozzle is inserted through the opening 108 in the cover 100. The latch structure may include one or more resilient members that bias the latch structure toward a latched position; in this case, it is possible to couple the door 104 with the latch structure to bias the door 104 toward a closed position as well, thereby causing the door 104 to close at the same time the latch structure latches the flapper or vice versa. This would eliminate the need for a separate resilient member in the cover 100 itself. Integrating the protective door with the latch structure therefore allows the flapper to be closed and sealed and the sliding door to cover the flapper at substantially the same time without requiring the user to carry out a separate motion to move the door to a closed position.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An assembly for covering a filler neck in a fuel system, comprising:
    a body portion having an opening that corresponds to an opening in the filler neck;
    a protective door coupled to the body portion, wherein the door is slidable between an open position that exposes the opening in the body portion and a closed position that covers the opening in the body portion; and
    a pair of spaced body protrusions disposed on the body portion at a first distance from each other; and
    a pair of spaced door protrusions disposed on the door at a second distance from each other,
    wherein the body protrusions and the door protrusions are spaced at a distance from each other to accommodate a nozzle of a first fuel type having a first nozzle diameter and to prevent accommodation of a nozzle of a second fuel type having a second nozzle diameter,
    wherein the first fuel type is gasoline and the second fuel type is diesel fuel, and wherein:
    the first distance on the body portion is larger than the first nozzle diameter and smaller than the second nozzle diameter to prevent the diesel fuel nozzle from passing between the body protrusions; and
    the second distance on the door is equal to or smaller than the first nozzle diameter to form a ledge that engages the gasoline nozzle to allow the gasoline nozzle to slide the door open.

2. The assembly of claim 1, wherein the body portion comprises a channel, and wherein the door is slidable along the channel between the open position and the closed position.

3. The assembly of claim 1, further comprising at least one resilient member that biases the door to the closed position.

4. The assembly of claim 1, further comprising:
    at least one recess formed in one of the body portion and the door; and
    at least one catch formed in the other of the body portion and the door, wherein the catch engages with the recess when a force substantially normal to the door is applied to the door.

5. The assembly of claim 1, wherein the door has a scraper to remove debris from the cover.

6. An assembly for covering a filler neck in a fuel system, comprising;
    a body portion having an opening that corresponds to an opening in the filler neck;
    protective door coupled to the body portion, wherein the door is slidable between an open position that exposes the opening in the body portion and a closed position that covers the opening in the body portion; and
    a pair of spaced body protrusions disposed on the body portion at a first distance from each other; and
    a pair of spaced door protrusions disposed on the door at a second distance from each other,
    wherein the body protrusions and the door protrusions are spaced at a distance from each other to accommodate a nozzle of a first fuel type having a first nozzle diameter and to prevent accommodation of a nozzle of a second fuel type having a second nozzle diameter,
    wherein the first fuel type is urea and the second fuel type is gasoline and wherein:
    the first distance on the body portion is larger than the first nozzle diameter and smaller than the second nozzle diameter to prevent both the gasoline fuel nozzle and a diesel fuel nozzle from passing between the body protrusions; and
    the second distance on the door is equal to or smaller than the first nozzle diameter to form a ledge that engages the urea nozzle to allow the urea nozzle to slide the door open.

7. The assembly of claim 6, wherein the body portion comprises a channel, and wherein the door is slidable along the channel between the open position and the closed position.

8. The assembly of claim 6, further comprising at least one resilient member that biases the door to the closed position.

9. The assembly of claim 6, further comprising:
    at least one recess fanned in one of the body portion and the door; and
    at least one catch formed in the other of the body portion and the door, wherein the catch engages with the recess when a force substantially normal to the door is applied to the door.

10. The assembly of claim 6, wherein the door has a scraper to remove debris from the cover.

11. An assembly for covering a filler neck in a fuel system, comprising:
    a body portion having an opening that corresponds to an opening in the filler neck;
    a protective door coupled to the body portion, wherein the door is slidable between an open position that exposes the opening in the body portion and a closed position that covers the opening in the body portion; and
    a pair of spaced body protrusions disposed on the body portion at a first distance from each other; and
    a pair of spaced door protrusions disposed on the door at a second distance from each other,
    wherein the body protrusions and the door protrusions are spaced at a distance from each other to accommodate a nozzle of a first fuel type having a first nozzle diameter and to prevent accommodation of a nozzle of a second fuel type having a second nozzle diameter,
    wherein the first fuel type is diesel fuel and the second fuel type is gasoline, and wherein:
    the first distance on the body portion is equal to or larger than the first nozzle diameter to allow the diesel fuel nozzle to pass between the body protrusions; and
    the second distance on the door is equal to or smaller than the first nozzle diameter to form a ledge that engages the diesel fuel nozzle to allow the diesel fuel nozzle to slide the door open, wherein the second distance is also larger than the second nozzle diameter so that the gasoline nozzle passes between the door protrusions without engaging the door protrusions.

12. The assembly of claim 11, wherein the body portion comprises a channel, and wherein the door is slidable along the channel between the open position and the closed position.

13. The assembly of claim 11, further comprising at least one resilient member that biases the door to the closed position.

14. The assembly of claim 11, further comprising:
    at least one recess formed in one of the body portion and the door; and
    at least one catch formed in the other of the body portion and the door, wherein the catch engages with the recess when a force substantially normal to the door is applied to the door.

15. The assembly of claim 11, wherein the door has a scraper to remove debris from the cover.

* * * * *